United States Patent
Alexander et al.

[11] Patent Number: 6,117,463
[45] Date of Patent: Sep. 12, 2000

[54] PROCESS FOR PREPARING BATTERED FOODS

[76] Inventors: Grace Alexander; Ruben Alexander, both of 4649 Memorial Dr., Decatur, Ga. 30032

[21] Appl. No.: 09/200,004

[22] Filed: Nov. 25, 1998

[51] Int. Cl.[7] .................................................. A23L 1/31
[52] U.S. Cl. ........................ 426/92; 426/96; 426/281; 426/289; 426/291; 426/296; 426/641; 426/438
[58] Field of Search ............................ 426/89, 92, 281, 426/289, 291, 296, 438, 641, 644, 645, 647, 524, 96

[56] References Cited

U.S. PATENT DOCUMENTS

| | | |
|---|---|---|
| 3,669,674 | 6/1972 | Klug et al. . |
| 3,676,158 | 7/1972 | Fischer et al. . |
| 4,511,583 | 4/1985 | Olsen et al. . |
| 4,744,994 | 5/1988 | Bernacchi et al. . |
| 4,764,386 | 8/1988 | Bernacchi et al. . |
| 4,778,684 | 10/1988 | D'Amico et al. . |
| 4,808,423 | 2/1989 | Hansson ........................... 426/296 X |
| 4,897,275 | 1/1990 | Nagai et al. . |
| 5,262,185 | 11/1993 | Babka et al. . |
| 5,266,339 | 11/1993 | Samson et al. . |
| 5,595,777 | 1/1997 | Chalupa et al. . |
| 5,782,169 | 7/1998 | Hicks . |
| 5,786,566 | 7/1998 | Miller et al. . |
| 5,908,648 | 6/1999 | Afman et al. ...................... 426/96 X |

FOREIGN PATENT DOCUMENTS 6-2228242  3/1986  Japan .

*Primary Examiner*—Milton Cano

[57] ABSTRACT

The present invention provides a commercial process for preparing battered foods. The process produces a fully cooked food product coated with par-fry batter and includes the steps of: providing a quantity of raw food product; providing a conveying means to convey the raw food product through the various steps of the present invention; steam and heat-cooking the raw food product; chilling the food after the step of steam and heat-cooking, which chilling step both chills the product so that it does not continue to cook, and cools the product before it enters the following battering step; battering the food; par-frying the battered food; and lastly, and freezing the food for shipment.

6 Claims, 3 Drawing Sheets

PROCESS FOR PREPARING BATTERED FOODS

BACKGROUND OF THE INVENTION

1. Field of the Invention

The present invention relates generally to food processing systems, and more specifically to commercial processes for preparing battered foods. The process begins with a raw food product, and ends with a quality battered, fully cooked food product with a par-fried coating of batter. A variety of food products can be battered by the present invention including chicken, fish, chicken fried steak, potatoes, and a variety of other meats and vegetables.

2. Description of Related Art

Consumers are constantly searching for safe, better tasting foods that require less and less time to prepare from the time of thawing/ordering to the time of consumption. For example, commercial food processing companies provide fast food restaurants and the like with large quantities of several types of par-fried and fully fried food products. These food processing companies must keep up with the tremendous demand in, for example, poultry in the form of chicken fingers, created by the customers of these restaurants. Customers demand the tastiest chicken fingers having a hot, moist chicken piece surrounded by a crispy batter, which chicken finger can be served almost immediately after ordering. Typically, these consumers have little time to wait during the preparation of this meal. Restaurants simply are not afforded time to process and prepare, nor the capital to invest in or floor space to dedicate to the entire process to prepare, a filly battered and fried chicken finger from a raw, frozen chicken piece every time such a meal is ordered.

Other comestibles such as meat, fish and vegetables also are commonly first batter coated, then breaded, cooked by pan frying or deep flying, and finally frozen. These frozen products too are sold to the food service industry or to the consumer at retail for finish cooking either by baking or frying.

There is thus constant innovation in the field of food processing to find just the right mix of heating, cooling, battering and frying to develop a superior food product that will please the end consumer both in taste and in time of preparation. Presently, upon reheating a frozen product, the consumer is left with a food product reminiscent of the reheated TV dinner; a soggy, undercooked/overcooked food product that, if battered, has little or no batter left in tact.

In the search for a superior battered food, the present invention provides an end food product that, upon reheating, has a fill flavor being both juicy on the inside and crispy on the outside, while retaining its fill complement of batter that presents a visually appealing to the consumer. Most conventional battering processes that begin with a raw food product and end with an inferior tasting fully cooked food product are designed only to process chicken. The present invention can easily and simply be modified by, for example, adjusting the times in which the product is left in the various steps of the process, so the present process can handle many different types of food products, including chicken, meat, fish and vegetables.

Several subaltern methods of food preparation are known. For example, U.S. Pat. No. 3,669,674 to Klug et al. only discloses a small portion of a system to prepare foods, focusing on a process for coating a food product attendant the flying thereof, wherein the coating consists of a first dry powder layer, a first batter layer on top of the first powder layer, a second powder layer and then a second batter layer. It is disclosed that the powder and batter compositions may be the same. Klug et al. further discloses specific ingredient ranges for the powder and batter.

U.S. Pat. No. 3,676,158 to Fischer et al. discloses another limited subprocess of a full system to prepare foods from a raw product to a fully cooked product, teaching coating a food product with gel-forming material, batter and breading. U.S. Pat. No. 4,511,583 to Olson et al. discloses a process of providing a film-forming agent to a battered and breaded food product prior to cooking. U.S. Pat. Nos. 4,744,994 and 4,764,386 to Bernacchi et al. disclose more complete processes that include applying a first batter coating to a food product, flying the product, applying a second batter coating, and then freezing the food product.

U.S. Pat. No. 4,778,684 to D'Amico et al. discloses a process for preparing a battered food product comprising applying a product to foodstuffs prior to a batter layer, so that upon microwave reheating of the food, the food retains its crispness. U.S. Pat. No. 4,897,275 to Nagai et al. discloses coating a food material with a particle/powder mixture.

U.S. Pat. No. 5,262,185 to Babka et al. discloses a complete chicken frying process involving precooking the chicken by searing it in water, then applying product, batter and breading to the chicken, and then frying it in oil to set the coating materials. The chicken product is then oven baked and frozen. U.S. Pat. No. 5,266,339 to Samson et al. discloses applying batter coatings to chicken that has been heated. After initial heating, the chicken is predusted, battered and breaded. U.S. Pat. No. 5,595,777 to Chalupa et al. discloses a process to gel coat a food product by applying an aqueous batter, then a dry bread material, and lastly applying an aqueous gel-forming solution over the food.

U.S. Pat. No. 5,782,169 to Hicks discloses a food processing system, mainly for bread manufacturing, having a product baking stage, a product processing stage, and an endless conveyor which is used to move the product through the two stages. The baking stage comprises a baking chamber and heating elements. The processing stage comprises a chamber through which travel promotes proving of dough. The system may further include a product cooling stage and a refrigeration stage. Lastly, U.S. Pat. No. 5,786,566 to Miller et al. discloses a conventional oven food preparation system.

Given the state of the process of battered comestible art as described above, there is a continuing need for new and useful processes for preparing quality par-fried battered comestible products, which processes are faster, safer, and more cost efficient than prior art techniques.

Therefore, it can be seen that a need yet exists for a process for preparing battered comestibles. There is a further need to provide battered food products that are crisper upon reheating.

BRIEF SUMMARY OF THE INVENTION

Briefly described, in its preferred form, the present invention provides a method for preparing frozen food products which are fully cooked food products coated with par-fried batter. The present process preferably comprises the following steps:

(a) providing a quantity of raw food product;
(b) providing a conveying means to convey the raw food product through the various steps of the present invention;
(c) steam and heat-cooking the raw food product;

(d) chilling the food after the step of steam and heat-cooking, which chilling step both chills the product so that it does not continue to cook, and cools the product before it enters the following battering step;

(e) battering the food;

(f) par-frying the battered food; and lastly, (g) freezing the food for shipment.

A raw food product at ambient temperature is the preferred initial food product for the present process. That is, for meat, poultry and fish, the most desirable final battered product begins with a raw product in the beginning of the process. For vegetables, fruits and the like, a fresh product is most desirable. While an initially raw/fresh initial product is preferred, the present process can accommodate an initial food product that has been frozen and thawed, that is above or below ambient temperature and that has already been partially cooked.

The steam and heat-cooking temperature and the time period the product stays within the cooking chamber can be adjusted for the various types of food products the present invention is designed to handle. Each component step of the present invention can similarly be adjusted. Some of the adjustments can be incorporated by simply manipulating the conveyor drive velocity.

The preferable steam and heat-cooking step may comprise only a steam cooking step or a dry heat-cooking step. Yet if the product is only cooked with steam, the final product typically lacks the firmness, texture or flavor of a steam and heat-cooked product. If the product is only heated, the skin on food products like chicken and fish separates from the product and shrinks, leaving the product exposed, also producing an inferior product.

In the conventional processing lines, typically the food product is first breaded, then steamed, cooked and finally frozen. Further, the batter is fully cooked in the conventional process. One of the problems with this conventional process line is that the steaming step follows the breading step, which induces the breading to crack off, ultimately providing an unattractive final product that is both dry and scarred in areas of popped-offbatter. The final product is also dry because there is no chilling step included in the process that retains the product's juices.

In the present process, the batter is applied after steaming, and is not fully cooked before the frying step. Thus, the product retains its full compliment of batter because it is battered after steam and heat cooking, and the batter cooks evenly because the product is chilled before it is breaded, leaving an attractive and crispy coating enveloping the food. Further, the present process incorporates a chilling step to cool the product down to prevent the batter from starting to cook before the frying step. If the food product is too hot before entering the battering step, the batter will start cooking as soon as it is applied as a result of residual heat from the cooking step. The chiller also gives a feathering look and texture to the final battered product, instead of the unappealing smooth finish produced by the conventional processes.

Further, present manufacturers provide an end product that is fully cooked, so when the consumer reheats the product, the food actually becomes overcooked. Unlike the conventional processes, the present invention par-fries the batter coatings. Thus upon reheating, the batter becomes fully cooked, while the product inside is simply reheated producing a juicy final food product.

Not only do consumers demand a tastier food product that is ready in a minimum of preparation time, but they also insist the industry adopt a near zero tolerance for contamination. In the food industry, the safety of the consumer is of the utmost importance. Recently, food poisoning from undercooked and contaminated food products has made front-page news. Salmonella and the like thrive in undercooked food products, including meats, vegetables and fruits, and can be introduced to the food product by unclean handling. The liability placed upon food service providers makes it more important than ever that, for example, the fast food restaurants provide a fully cooked product that is never touched by unclean hands. Yet, this goal is not entirely attainable in reality. Typically, restaurant food preparers comprise a transient work force, required to work too quickly to ensure that the various steps of safe food preparation are complied with in the cramped restaurant kitchen. Further, it is nearly impossible to require every hand that works with the food to be sanitary at all times in this type of working condition.

Possibilities of contamination also arise because, even in present high-speed processing lines, the food product typically is loaded and unloaded into various vats at various stages of processing by manually grabbing the food product and transferring it to another step in the process. Not only is this technique unsanitary, but it also is time consuming.

In contrast, once the raw product is first loaded onto the conveyor in the present process, human hands never touch the product again until after the product has been packaged. This method eliminates the several possibilities of introducing contamination. Further, the present process fully cooks the product in the steam and heat-cooking step, killing any of the bad bacteria and normalizing the safety and preparation of the food product across restaurant chains and franchises. Thus, the consumer's safety is not left to chance depending on the individual restaurant location visited.

The present process enables a single location to cook and package the food product. Therefore, each individual restaurant can eliminate any reliance upon, and the capital expense for the steps of, cooking/frying battered food products. They need simply reheat food delivered from the present invention.

The Babka et al. process described above utilizes several steps in the production of a final frozen food product, but has several disadvantages overcome by the present process. First, the Babka et al. system can only be used with chicken. Second, the process comprises a marinate application that is not included in the present process because of the present process's unique breading steps. Third, Babka et al. comprises a searing step wherein the chicken is immersed in water, not steam and heat cooked. Fourth, Babka et al. does not teach a chilling step. Lastly, the chicken is manually handled at various steps.

Accordingly, an object of the invention is to provide a commercial process for preparing quality battered foods.

Another object of the invention is to provide an end food product which, upon reheating, has a fill flavor being both juicy on the inside and crispy on the outside, while retaining its full complement of batter that is also visually appealing.

A further object of the invention is to provide a process for preparing par-fried battered comestible products, which process is faster, safer, and more cost efficient than prior techniques.

These and other objects, features and advantages of the present invention will become more apparent upon reading the following specification in conjunction with the accompanying drawing figures.

DETAILED DESCRIPTION OF A PREFERRED EMBODIMENT

Figure 1:
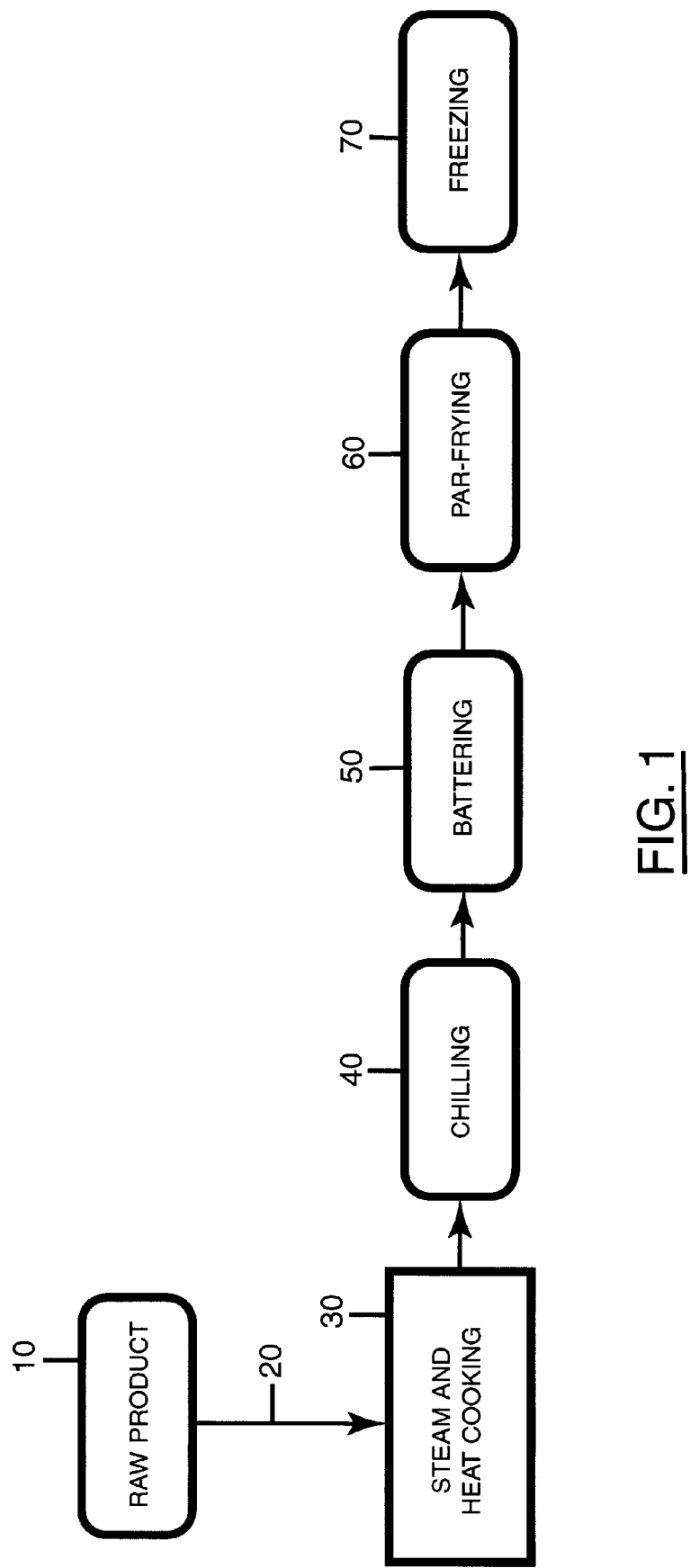
FIG. 1 is a flow diagram of the preferred embodiment of the present invention.

Referring now in detail to the drawing figures, wherein like reference numerals represent like parts throughout the several views, FIG. 1 illustrates a flow diagram of the line assembly for the preparation of a battered food product according to a preferred embodiment of the present invention. Briefly described, in a preferred form, the present invention provides a process and system that produces a fully cooked food product having a par-fried batter coating. The present process preferably comprises the following steps:

(a) providing a quantity of raw food product 10;

(b) providing a conveying means 20 to convey the raw food product 10 through the various steps of the present invention;

(c) steam and heat-cooking 30 the raw food product 10;

(d) chilling 40 the food 10 after the step of steam and heat-cooking 30, which chilling step both chills the product 10 so that it does not continue to cook, and cools the product 10 before it enters the following battering step 50;

(d) battering 50 the food product 10;

(e) par-frying 60 the battered food 10 thus providing a cooked product 10; and lastly, (f) freezing 70 the food product 10 for shipment.

After freezing, typically the food product is then packaged for shipment.

Figure 3:
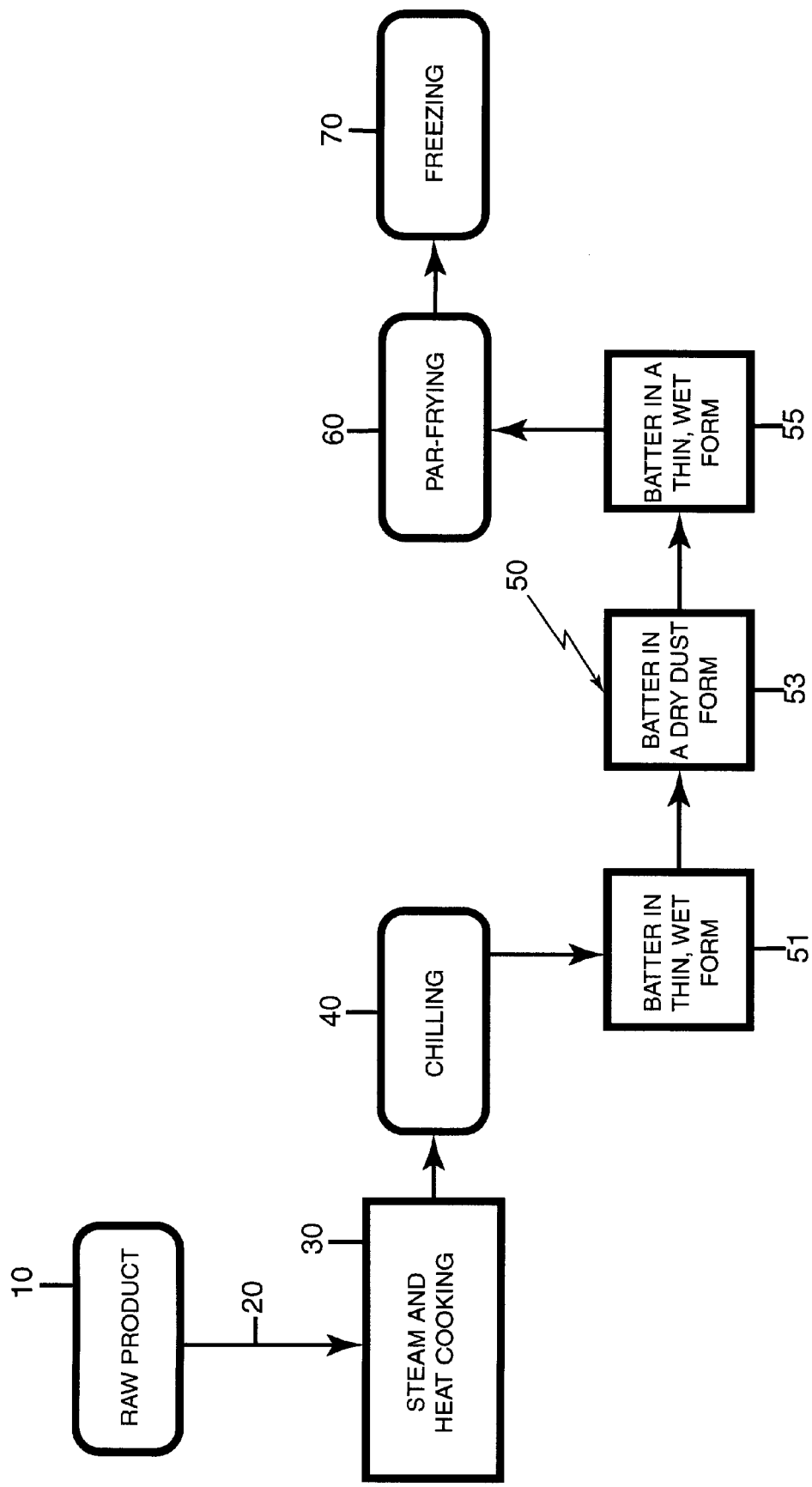
FIG. 3 is a flow diagram of the present invention illustrating the preferred battering step.

Preferably, as shown in FIG. 3, the step of battering 50 the food product 10 comprises three separate substeps, all using the same batter composition:

(1) applying 51 a batter on the product in a thin, wet form (instead of the milk wash step of prior processes) both reducing the risk of contamination associated with milk wash and providing that the following two battering steps 53, 55 work most efficiently;

(2) dry dusting 53 the same batter on the product 10 (instead of the prior use of bread crumbs) which allows the food 10 to be fully coated; and, (3) applying 55 the same batter in a thicker, wet form for the last coat (unlike prior processes that use a tempura batter) which seals the product 10, both providing a crisper final product 10, and retaining the maximum juices in the product 10.

Figure 2:
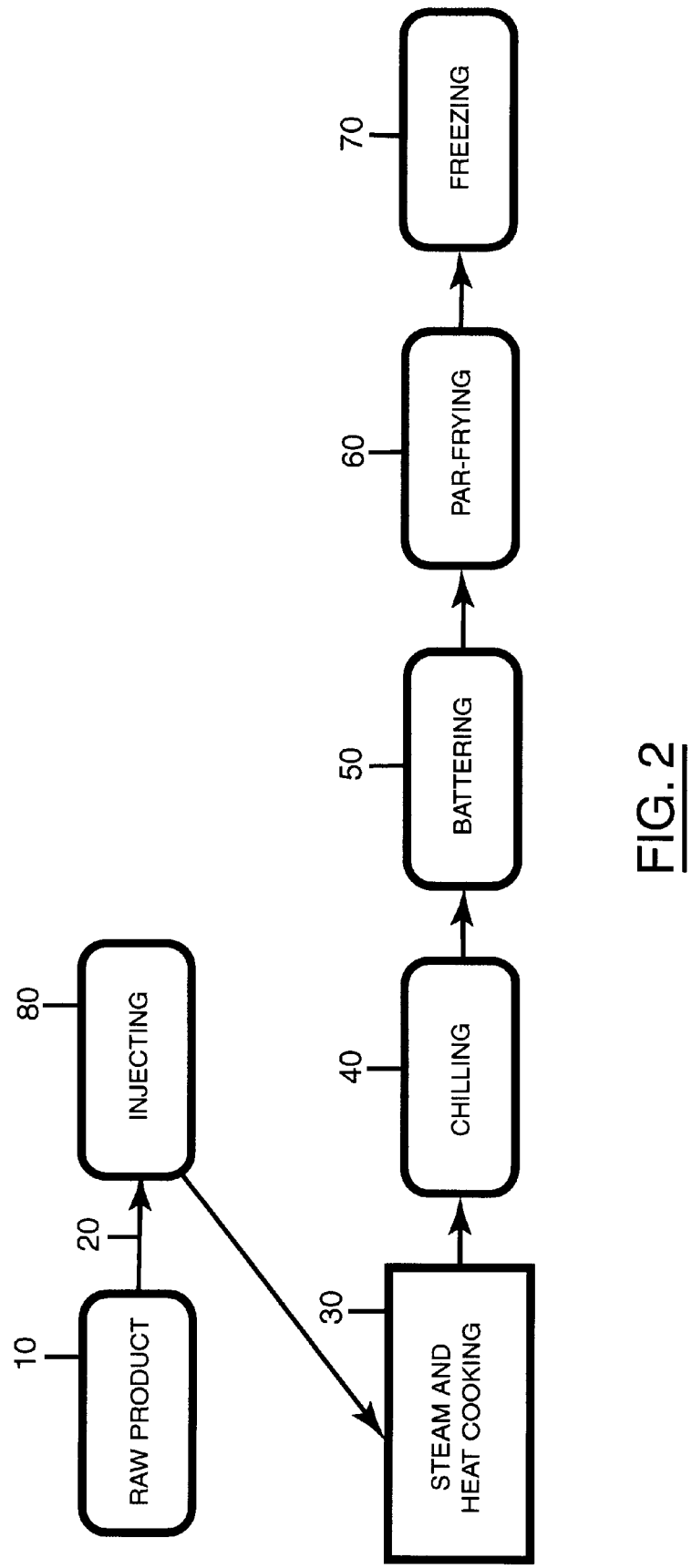
FIG. 2 is a flow diagram of another preferred embodiment of the present invention including an injecting step.

Several variations of the above process exist in other preferred embodiments. For example, as shown in FIG. 2 a step of injecting 80 the product 10 with, for example, water to create a juicier final product can be added to the present invention before the steam and heat-cooking step 30. Further, the present process can be a par-frying process by removing the steam and heat-cooking and chilling steps 30, 40, and beginning the process at the battering stage 50.

The present process and system can provide a quality battered food product comprising a variety of food products including meat, fish, and vegetables. When working with poultry and beef, the present invention preferably comprises the step of injecting 80, steam and heat-cooking 30 and chilling 40. Depending on the thickness and type of fish, a thicker cut of fish like a thick salmon steak or swordfish steak can also begin at the injecting step. A thinner cut of fish preferably begins at the battering step and produces a final par-fried product. Fish typically does not need to be injected with a water solution, nor would steam and heat-cooking be preferable for a thin cut of fish. With a thin cut of fish, the steam and heat-cooking step used in one sense as a safety measure to kill bad bacteria, is not as important because fish does not contain the amount of harmfull bacteria that poultry or beef can.

Vegetables and the like preferably also begin at the battering step 50 as they do not need the injection of a water solution, and the steam and heat-cooking step 30 can damage the fresh vegetables before battering.

Preferably, the conveying means 20 comprises an endless conveyor having both a forward path, which extends through all of the steps of the present invention, and a return path. The raw food product 10 is placed in a hopper of an accumulation metering conveyor that places the product 10 on the conveyor belt 20 and transports the food product 10 to the first step of either steam and heat 30 cooking, or injection 80, of the present invention. Time constraints on each step of the present invention are adjustable depending on the type of food product. For example, several of the steps used with fish are shorter then those used for a chicken thigh. Similarly, the times for a chicken wing typically are shorter than those for the thigh.

In one preferred embodiment, the food product 10 first enters an injecting step 80. In the injecting step 80 the product 10 is injected preferably with a water solution. The injector can feature retractable needles and can be used for bone-in or boneless products.

The steam and heat-cooking stage 30 generally comprises a cooking chamber or oven through which the conveyor 20 is directed to follow through. The product 10 can be fully or partially cooked in the cooking chamber, but is preferably fully cooked which kills any harmful bacteria. The chamber cooks the food product 10 with a combination of both heat and steam. This method of cooking with heat and steam helps retain a majority of the product's natural juices. Preferably, the product 10 is fully cooked with gas-fired heat and steam. By adjusting the conveyor belt speed, the time and degree of cooking can be manipulated. It has been found that an oven temperature range of 325 to 400 degrees, and a cooking time of between 8 and 14 minutes provides the best food product 10 comprising poultry.

Once the product 10 leaves the cooking chamber, it preferably proceeds on the conveyor 20 to the chilling step 40 comprising a chiller that chills the product 10. This chilling step 40 helps the product retain its juices, and keeps the batter from the following battering step 50 from becoming tough and chewy. In conventional processes without a chilling step, the juices begin to flow out of the product before the product is battered. In the present process, the product is chilled so it does not lose its juices during the period of time from exiting the chilling step 40 to entering the par-frying step 60. As an alternative to the chiller, the food product 10 can be immersed in a vat of chilled water. Yet this immersion into cool water is not preferred because chilled water draws juices out of the product 10.

Cooling the product 10 before the battering step 50 also provides for both better batter adherence to the food 10, and produces the desirable feathering of the batter on the product 10. This better adherence again helps retain the juices in the food 10 and produces a crispy (not chewy) batter. If the product 10 is not chilled before battering 50, the food product 10 continues to cook through the battering step 50 due to retained heat in the product, and thus the batter becomes very tough and chewy. Further, if the product 10 is not cooled, the batter lies flat on the product 10, not the preferred feathered/wrinkled texture, giving it an unappealing look and texture.

The battering step 50 preferably utilizes one product for all three conventional battering substeps. The product is battered 51, dusted 53 and battered 55 again before proceeding to the par-frying step 60. This battering process 50 produces a premium, cost-effective final product 10. The product 10 is first immersed into an all-purpose battering machine that is filled with a thin batter wash. In a preferred embodiment, this batter wash comprises 70% to 86% water with a 30% to 14% compliment of dry batter.

The product 10 then proceeds on the conveyor 20 to the second substep 53 of the three step batter method 50, which second step 53 comprises coating the product 10 with a dry coating of the same batter. Dry coating the product can be applied with, for example, the Stein XL three flip coater that allows the product to be fully coated while any excess of dry coating is removed. Utilizing the first two substeps 51, 53 of the battering step 50 in order provides a filly dry coated product 10 with few if any surface voids. The dry dust adheres to the thin batter wash better than it does on an uncoated product.

Continuing on the conveyor belt, a third substep 55 applies coating comprising a thicker, wet batter of the same recipe to the product 10 by the same type of batter applicator that was used for the first substep 51 batter wash. The thicker batter preferably comprises 60% to 75% water with 40% to 25% dry batter, depending on the amount of weight desired for the final batter coating. Applying this third coating seals the product and provides a juicy, crisper premium product.

After the three substep battering coating process 50, the product 10 then proceeds to a frying step 60. The flyer is preferably filled with pure vegetable oil. The fryer should continuously filter the oil. Typically, if the oil is not filtered, there exists a burnt taste that comes from sediments left in the oil. This problem plagues the present, conventional processes. The product is fried, preferably for 2 to 4½ minutes, which should be long enough to par-fry the batter coating. This step 60 allows the final product to be baked or fried without drying out the fully cooked product. In this step 60, the batter on the product is cooked to a beautiful golden color, while the food product inside the coating is fully warmed without losing its juices. While the frying step can fully cook the batter, instead of par-frying, in the present process the consumer will be left with a very dry and dark, tasteless product. The product should remain on the conveyor belt long enough so that any excess oil drips off before the product reaches the freezing step 70.

Conventional frying at individual restaurants produces a large amount of waste oil. Batter droppings cause frequently oil changes because the batter drops to the bottom of the fryer and chars. The present process eliminates this wasteful cycle.

Lastly, the product is frozen 70 and readied for packaging and shipping.

Upon reheating a food product produced from the battering process of the present invention, the fish, chicken, potato, chicken fried steak, chicken fried chicken or other meat or vegetable remains juicy and plump on the inside, and crunchy and crispy on the outside 50.

Preferably, the present process can produce 6,000 lbs./hr. of frozen food product. The present invention can also be altered into a par-frying process by beginning the above process at the battering step.

The present battering step 50 comprising the use of a single batter that not only is cost effective, but also produces a superior battered product. The first substep 51 comprises applying the batter in a thin wet form, instead of using a milk wash used in conventional processes. The second substep 53 comprises applying the same batter as a dry dusting, instead of the additional expense of purchasing breadcrumbs. The third substep 55 comprises applying the batter in a thicker wet form for the last coating, where other manufacturing processes require the purchase of a tempura batter. Present manufacturers must still buy three different products in order to use a three-step battering method. Further, the present battering step 50 uses a batter component comprising only water and dry batter. This composition does not mix any milk products that can lead to contamination if spoiled.

In a preferred embodiment of the present invention, the various components of the system of the present invention, preferably comprises the following components:

A MEPSCO Poultry Water Injector, preferably the BI-244 injector for boneless products, chicken fillets and other boneless products. The BI-244L water injector has extra high clearance for handling bone-in chicken and other bone-in products. It produces maximum yields on 31½" wide bed with production rates up to 15,000 lbs./hr.;

A STEIN GYRoCOMPACT High Steam and Heat Cooker which forms a self-contained cooking chamber. The entire stack turns as a unit while hot air and steam are vertically directed at the product. While this cooker can cook with dry heat, steam alone, or a combination of heat and steam, it is preferably to cook with the combination because if only steam alone is used, the final product will have a tendency to lose its firmness and texture.

A STEIN GYRoCOMPACT Chiller is preferred to chill the product as it comes from the steam and heat cooker;

An ABC-III Batter Applicator is used for applying the thin coat of batter which helps in the pick-up of the dry dusting application;

The dry coating is applied by the ABC XL 3 Flip Coater allowing the product to be fully coated and the excess of the dry coating to be removed leaving no voids on the surface of the product;

The third coating of a thicker wet batter is applied by the ABC-II Batter Applicator. Applying this coating seals the product and produces a crisper product and does not allow the juices to escape from the product A STEIN TFF-II THERMOFIN Fryer is used to par fry long enough to seal the batter application to retain its juices; and Lastly, the product leaves the fryer and proceeds directly to a GYRoCOMPACT Freezer where it is frozen and readied for packaging.

Just a few of the improvements over the prior art are believed to be that the present process fully cooks the product in the steam and heat cooker (thereafter only requiring reheating to cook the par-fried battered and warm the product), killing all troublesome bacteria (i.e., salmonella) and utilizing a three substep battering process which uses the same batter product throughout.

While the invention has been disclosed in preferred forms, it will be apparent to those skilled in the art that many modifications, additions, and deletions can be made therein without departing from the spirit and scope of the invention as set forth in the following claims.

What is claimed is:

1. A process for preparing battered foods comprising the steps of:
    (a) providing a quantity of food product;
    (b) providing a food conveyor to convey the food product through the various steps of the process;

(c) cooking the food product;

(d) chilling the food product;

(e) battering the food product with batter; and (f) par-frying the battered food product.

2. The process of preparing battered foods according to claim 1, comprising the further step of injecting the food product with a water solution before the steam and heat-cooking step (c).

3. The process of preparing battered foods according to claim 2, comprising the further step of freezing the food product after the par-frying step (f).

4. The process of preparing battered foods according to claim 2, wherein the step of battering the food product (e) comprises the substeps of:

(i) providing a dry batter;

(ii) applying to the food product a thin, wet form of the batter;

(iii) dry dusting onto the food product the dry batter; and (iv) applying to the food product a thicker, wet form of the batter.

5. The process of preparing battered foods according to claim 4, wherein the food product is fully cooked upon exiting the step (c) the food product cooking.

6. A process for preparing battered foods comprising the ordered steps of:

(a) providing a quantity of raw food product;

(b) providing a food conveyor to convey the raw food product through the various steps of the process;

(c) injecting the food product with water to provide for a juicier final battered food product;

(d) steam and heat-cooking the raw food product until the raw food product is fully cooked;

(e) chilling the food product, which chilling step both chills the food product so that it does not continue to cook, and cools down the food product;

(f) battering the food product with a batter, said battering step including the following substeps:

(i) providing a dry batter composition;

(ii) preparing a thin, wet form batter from a portion of the dry batter composition;

(iii) applying to the product the portion of thin, wet form batter;

(iv) dry dusting onto the product a portion of the dry batter composition;

(v) mixing a portion of the dry batter composition with water into a thicker, wet form batter than the thin, wet form batter of substep (ii); and (vi) applying to the product the thicker, wet form batter;

(g) par-frying the battered food product; and (h) freezing the par-fried, battered food product.

\* \* \* \* \*